Figure 1:
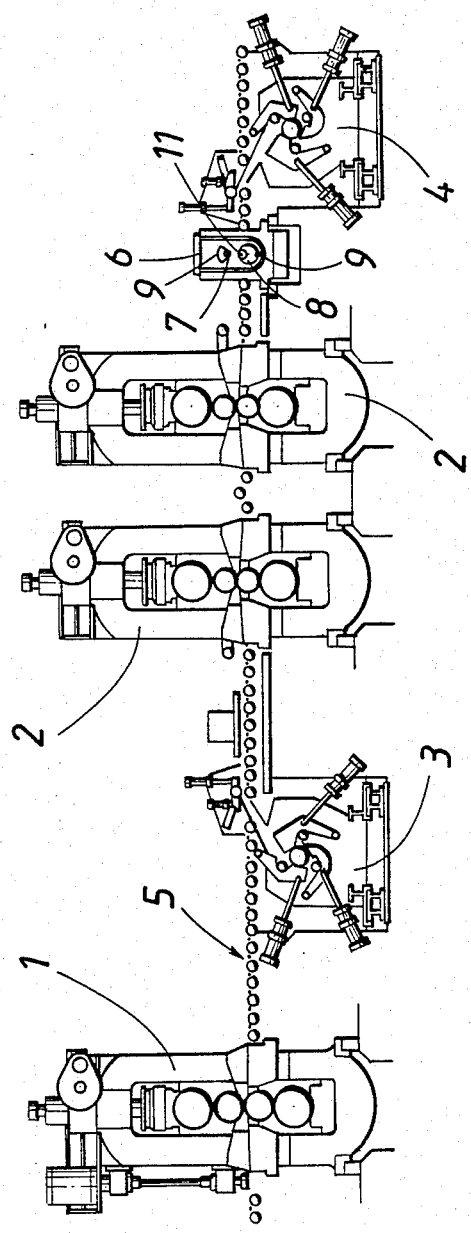

United States Patent [19]

Brettbacher et al.

[11] Patent Number: 4,494,395
[45] Date of Patent: Jan. 22, 1985

[54] HOT-ROLLING PLANT

[75] Inventors: Franz Brettbacher, Linz; Buchegger Rudolf, St. Florian, both of Austria

[73] Assignee: Voest-Alpine Aktiengesellschaft, Linz, Austria

[21] Appl. No.: 468,084

[22] Filed: Feb. 22, 1983

[30] Foreign Application Priority Data

Mar. 5, 1982 [AT] Austria ................... 870/82

[51] Int. Cl.³ .............................................. B21B 1/00
[52] U.S. Cl. ........................................ 72/203; 72/221; 83/322
[58] Field of Search .................... 72/203, 288; 83/322, 83/345

[56] References Cited

U.S. PATENT DOCUMENTS

| 3,322,012 | 5/1967 | Murray | 83/345 |
| 4,188,812 | 2/1980 | Nomura et al. | 72/203 |
| 4,420,999 | 12/1983 | Hirakawa et al. | 83/345 |

FOREIGN PATENT DOCUMENTS 3030382 3/1981 Fed. Rep. of Germany .
1367812 6/1964 France .

Primary Examiner—E. Michael Combs
Assistant Examiner—Charles Rosenberg
Attorney, Agent, or Firm—Kurt Kelman

[57] ABSTRACT

A hot-rolling plant comprises forward and rear reversible coilers, a reversible finishing stand disposed between the coilers, and crop shears including upper and lower cutter cylinders. To permit trimming of the stock to be rolled between finishing passes, the crop shears are disposed between the finishing stand and the rear reversible coiler, and a backing roller for supporting the stock is rotatably mounted on the lower cutter cylinder on an axis which is parallel to the axis of rotation of the lower cutter cylinder.

3 Claims, 4 Drawing Figures

HOT-ROLLING PLANT

This invention relates to a hot-rolling plant comprising forward and rear reversible coilers, at least one reversible finish-rolling mill stand disposed between said coilers, and crop shears comprising upper and lower cutter cylinders.

As a strip to be rolled cannot be smoothly introduced into a rolling mill stand unless the leading end of the strip is properly shaped, so-called crop shears are used in rolling plants to properly trim the leading end of the strip. To avoid a braking of the stock which is to be trimmed, the crop shears comprise cutter cylinders which can be driven at a circumferential velocity which matches the velocity of the stock to be rolled so that the cutters of the shears can be moved in unison with the stock to be rolled during the cutting operation.

In conventional plants, the crop shears precede the forward reversible coiler associated with the finishing stand. But that arrangement of the shears involves the disadvantage that when the cropped end is not properly shaped the hot strip cannot be trimmed between the finishing passes because for such trimming the crop shears would have to be disposed between the reversible finishing stand and the reversible coiler. The known shears are not provided in such an arrangement because there is no support for the hot strip adjacent to the crop shears and the rollers of the roller beds must be widely spaced apart adjacent to the stand.

Laid-open German Application No. 3,030,382 discloses a non-reversible finish-rolling train comprising a coiler for coiling strip which has been broken down in a breaking-down train. That coiler is then laterally displaced and the strip withdrawn from the coiler is delivered to a finish-rolling train, which is disposed beside the breaking-down train and in which the strip travels in a direction which is opposite to the direction of travel in the breaking-down train. Crop shears are provided between the coiler and the finish-rolling train. The teaching to provide crop shears in such an arrangement in association with a non-reversible finish-rolling train does not afford a solution to the problem encountered with reversible rolling mill stands because the known crop shears do not support the strip so that roller beds of substantial length are needed for a satisfactory support of the strip before and behind the shears and an excessively large distance between the reversible coiler and the finishing stand is required.

To provide an additional support for the strip between two strip guides which respectively precede and succeed a transverse cutting apparatus comprising rotary cutter cylinders, it is known from French Patent Specification No. 1,367,812 to provide the cutter cylinder disposed below the strip with a tangential supporting surface, which can be engaged with the underside of the strip by a suitable lifting of the cutter cylinder. Because the lower cutter cylinder must be adjustable in height, that design involves a substantial expenditure and the disadvantage that the tangential supporting surface cannot be moved into surface contact with the strip unless the lower cutter cylinder is exactly in a predetermined rotational position. Because such shears are preceded and succeeded by strip guides, the shears cannot be used as crop shears and the strip is supported by the preceding and succeeding strip guides in such a length that the distance between the strip-working units which precede and succeed said shears is increased.

It is an object of the invention to avoid these disadvantages and so to improve a hot-rolling plant of the kind described hereinbefore that improperly shaped cropped ends of the strip can be trimmed between finishing passes.

This object is accomplished according to the invention in that the crop shears are disposed between the finishing stand or stands and one of the reversible coilers, preferably the rear reversible coiler, and a backing roller for supporting the stock to be rolled is provided and is rotatably mounted on the lower cutter cylinder of the crop shears and is axially parallel to said cutter cylinder.

Because a backing roller for supporting the stock to be rolled is rotatably mounted on the lower cutter cylinder, the stock to be rolled can be properly guided also adjacent to the crop shears by means which will not interfere with the operation of the shears. When the lower cutter cylinder is driven to cut the strip, the backing roller will be rotated by the cutter cylinder away from the stock to be rolled so that space is provided for the cut effected by the knives. When the cut has been effected and the cutter cylinder has performed an entire revolution, the backing roller again engages the stock to be rolled so that the stock is guided after the cut in the same manner as before. Such crop shears can be used without a need for additional means for supporting and guiding the stock to be rolled as close as possible to the crop shears. For this reason the crop shears can be provided between a reversible coiler and a finishing stand without a need for providing an excessively large distance between the reversible coiler and the stand. As a result, the hot strip can be trimmed at either end also between successive finishing passes.

Special advantages are afforded by the provision of the crop shears between the rear reversible coiler and the finishing stand preceding said coiler because the crop shears succeeding the finishing stand can also be used to trim the finish-rolled strip at its forward and rear ends. This would otherwise require separate shears.

The backing roller mounted on the lower cutter cylinder of the crop shears may be designed like the rollers of the roller bed used to feed the strip. To avoid a difference between the backing roller and the rollers of the roller bed, the backing roller may be driven. Because the backing roller is rotatably mounted on the cutter cylinder, which rotates during the cutting operation, the backing roller must be driven by means of a universal-joint shaft. Such universal-joint shaft will not have to be telescopic if it connects the backing roller to a drive shaft which is coaxial to the lower cutter cylinder. Because that drive shaft is coaxial to the axis of rotation of the lower cutter cylinder, a rotation of the lower cutter cylinder will result in a movement of the universal-joint shaft around the surface of a straight circular cone so that the length of the universal joint shaft need not be changed.

The invention is illustrated by way of example on the drawing, in which

Figure 2:
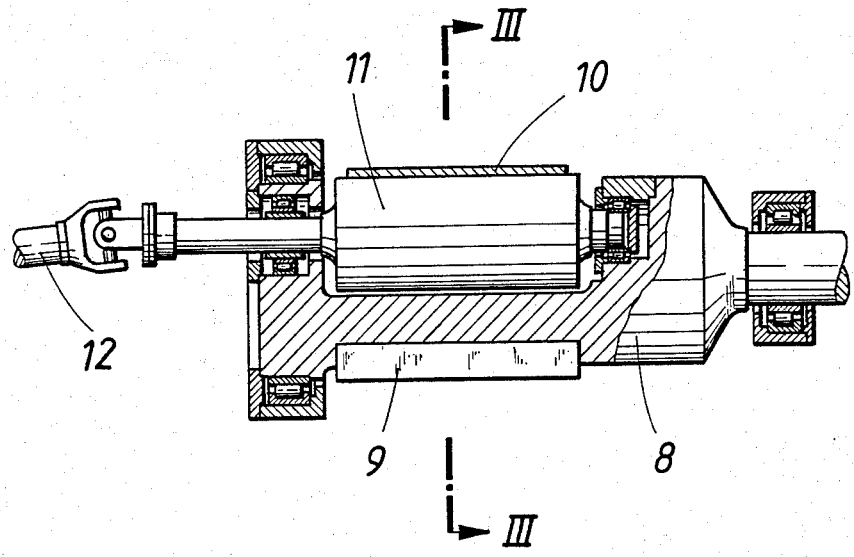
Figure 3:
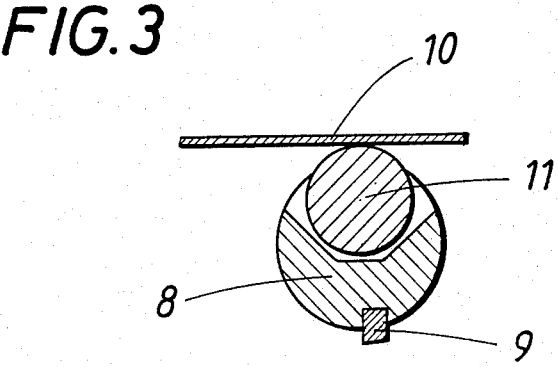
Figure 4:
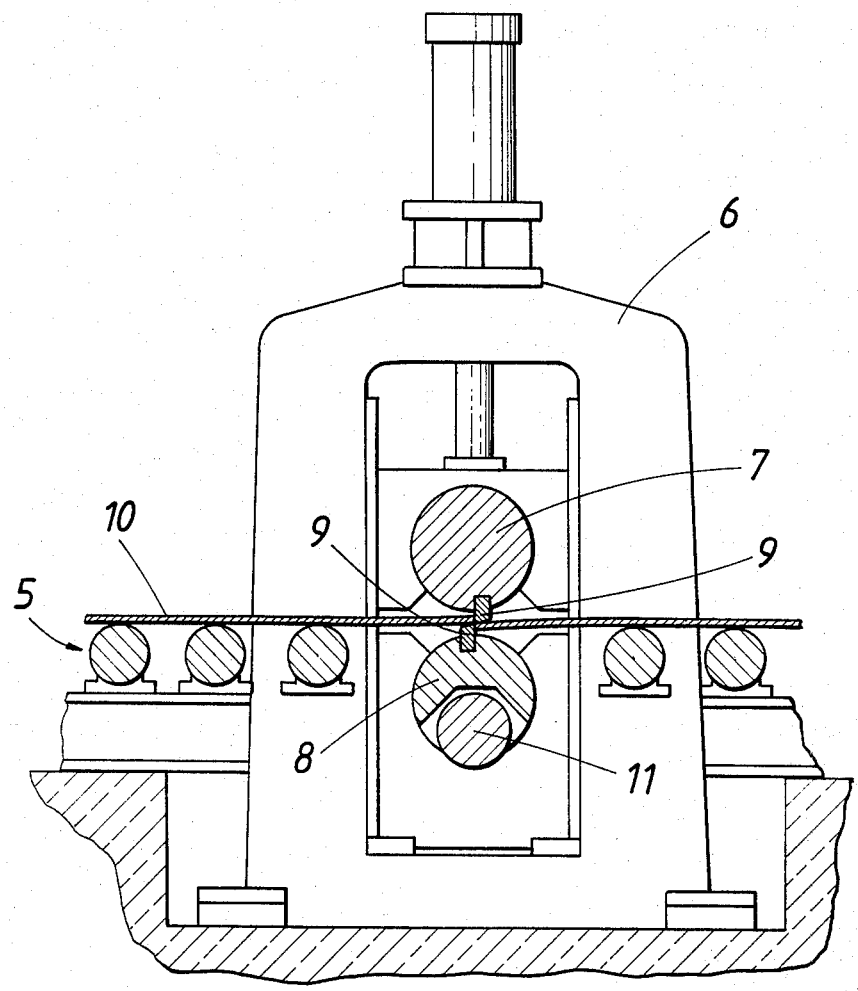

FIG. 1 is a diagrammatic side elevation showing a plant which embodies the invention and is used for hot-rolling strip, FIG. 2 is a longitudinal sectional view showing on a larger scale the lower cylinder cutter of the crop shears, FIG. 3 is a sectional view taken on line III—III of FIG. 2, and FIG. 4 is a side elevation, partly in section, showing on an enlarged scale the crop shears including the upper cylinder cutter.

The plant shown in FIG. 1 is used to hot-roll strip and comprises a breaking-down rolling mill stand, two finishing rolling mill stands 2, which directly succeed each other, a heated forward reversible coiler 3 preceding said finishing stands, and a rear reversible coiler 4, which succeeds the finishing stands and is designed like the coiler 3. The arrangement is such that the braking-down stand 1 is as close as possible to the reversible coiler 3 so that the stands 1 and 2 can selectively be used individually or jointly or in tandem.

The strip to be rolled is moved through the rolling mill plant on a roller bed 5. To permit a cutting of said strip also between successive finishing passes performed by the finishing stands 2 in order to trim the strip at improperly shaped ends obtained during the finish-rolling, crop shears 6 comprising an upper cutter cylinder 7 and a lower cutter cylinder 8 are provided between the rear finishing stand 2 and the rear reversible coiler 4. Each of said cylinder cutters 7 and 8 carries a knife 9 and can be driven at a circumferential velocity which matches the speed of travel of the strip through the shears. As a result, the knives are moved in unison with the strip during the cutting operation.

Because the shears 6 closely succeed the finishing stand 2, it is essential to provide for the hot strip 10 adjacent to the crop shears a guidance which is equivalent to the guidance of the strip on the roller bed 5. This is ensured in that a backing roller 11 for supporting the hot strip 10 is rotatably mounted on the lower cutter cylinder 8. That backing roller 11 may be designed like the rollers of the roller bed 5 and is desirably mounted diametrically opposite to the knife 9 of the cylinder cutter 8. When the crop shears are in its position of rest, the backing roller 11 is in its supporting position shown in FIGS. 2 and 3. When the cutter cylinders 7 and 8 are driven to perform a cutting operation, the lower cutter cylinder 8 will be rotated to move the backing roller 11 downwardly away from the hot strip 10 so that space is provided for the cutting operation effected by the knives 9. When the cutter cylinder 8 has performed an entire revolution, the backing roller 11 again engages and supports the strip 10. Because the hot strip 10 is supported also by the backing roller 11, no problems will be involved in the provision of the crop shears 6 between the rear finishing stand 2 and the rear reversible coilers 3 and 4 and such an arrangement will not require a much larger distance between the finishing stand and the reversible coiler because the backing roller 11 is equivalent to a roller of the roller bed provided between the rear reversible coiler 4 and the preceding finishing stand and supports the hot strip in the gap which is required between the rollers of the roller bed 5 in order to accommodate the shears.

If the crop shears 6 were provided between the forward reversible coiler 3 and the finishing stand 2 directly succeeding said coiler, the crop shears 6 could also be used to trim the hot strip between successive finishing passes. The provision of the crop shears between the rear finishing stand 2 and the rear reversible coiler 4 will afford the additional advantage that the finish-rolled strip can also be trimmed at its forward and rear ends.

It is apparent from FIG. 2 that the backing roller 11 can be driven by means of universal-joint shaft 12. If the universal-joint shaft 12 is connected to a drive shaft which is coaxial to the cutter cylinder 8, a rotation of the latter will not result in a change of the length of the universal-joint shaft 12 so that a particularly simple structure will be obtained.

Plants embodying the invention may be used to hot-roll strip as well as plate stock.

What is claimed is:

1. In a hot-rolling plant comprising
a forward reversible coiler,
a rear reversible coiler,
reversible finish-rolling means disposed between said forward and rear reversible coilers, and
crop shears including an upper cutter cylinder and a lower cutter cylinder, which are mounted for rotation about upper and lower axes of rotation, respectively,
the improvement residing in that
said crop shears are disposed between said finish-rolling means and one of said coilers and
a backing roller for supporting stock to be rolled is mounted on said lower cutter cylinder for rotation about an axis which is parallel to said lower axis of rotation.

2. The improvement set forth in claim 1, which comprises drive means for rotating said backing roller.

3. The improvement set forth in claim 2, wherein said drive means comprise
a drive shaft which is coaxial to said lower cutter cylinder and
a universal-joint shaft connected at one end to said drive shaft and at the other end to said backing roller.

* * * * *

UNITED STATES PATENT AND TRADEMARK OFFICE
CERTIFICATE OF CORRECTION

PATENT NO. : 4,494,395
DATED : January 22, 1985
INVENTOR(S) : Brettbacher, Et Al It is certified that error appears in the above-identified patent and that said Letters Patent are hereby corrected as shown below:

Cover page, item [75], after second inventor's name and address, insert --Franz Hirschmanner, Leonding, Austria--.

Signed and Sealed this

Eighteenth Day of June 1985

[SEAL]

Attest:

DONALD J. QUIGG

Attesting Officer

Acting Commissioner of Patents and Trademarks